No. 799,592. PATENTED SEPT. 12, 1905.
H. G. DITTBENNER.
HORIZONTAL BAND RESAW.
APPLICATION FILED FEB. 12, 1904.

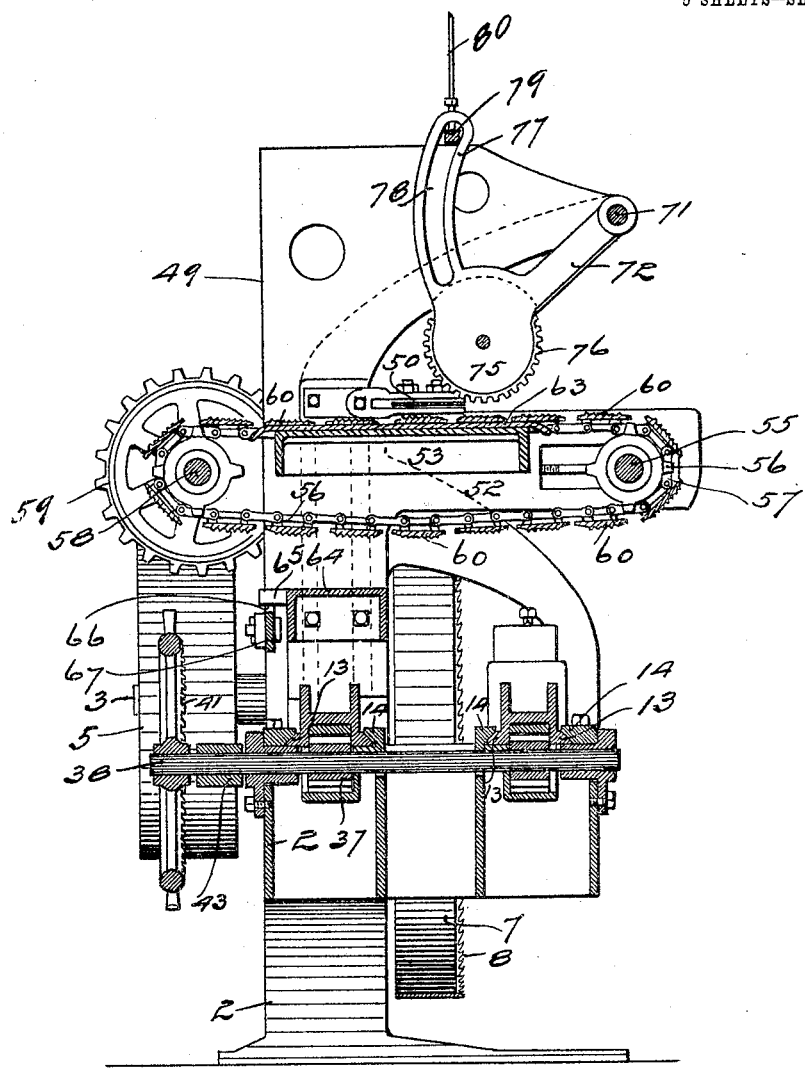
FIG. 3 X-X

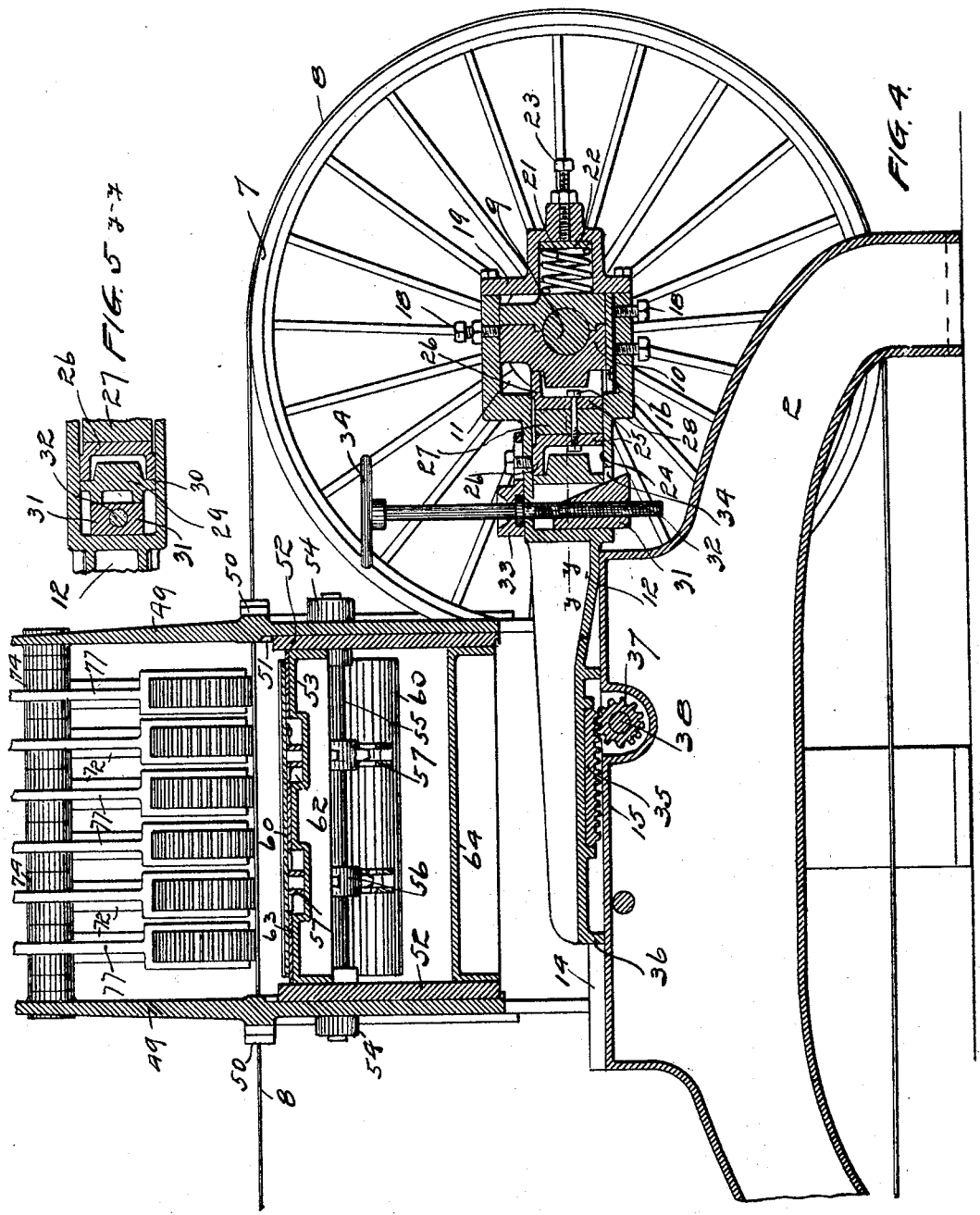

5 SHEETS—SHEET 5.

WITNESSES

INVENTOR
HERMANN G. DITTBENNER
BY
HIS ATTORNEYS

UNITED STATES PATENT OFFICE.

HERMANN G. DITTBENNER, OF MINNEAPOLIS, MINNESOTA, ASSIGNOR TO DIAMOND IRON WORKS, A CORPORATION OF MINNESOTA.

HORIZONTAL BAND-RESAW.

No. 799,592.     Specification of Letters Patent.     Patented Sept. 12, 1905.

Application filed February 12, 1904. Serial No. 193,245.

*To all whom it may concern:*

Be it known that I, HERMANN G. DITTBENNER, of Minneapolis, Hennepin county, Minnesota, have invented certain new and useful Improvements in Horizontal Band-Resaws, of which the following is a specification.

My invention relates to sawmill machinery; and the object of the invention is to provide an improved horizontal band-resaw having a feed mechanism which will accommodate itself automatically to several pieces of lumber of different thickness fed simultaneously and also to single pieces that vary in thickness from one edge to the other.

A further object is to provide a resaw of large capacity and one that is capable of rapid and convenient adjustment.

The invention consists generally in various constructions and combinations, all as hereinafter described, and particularly pointed out in the claims.

Figure 1:
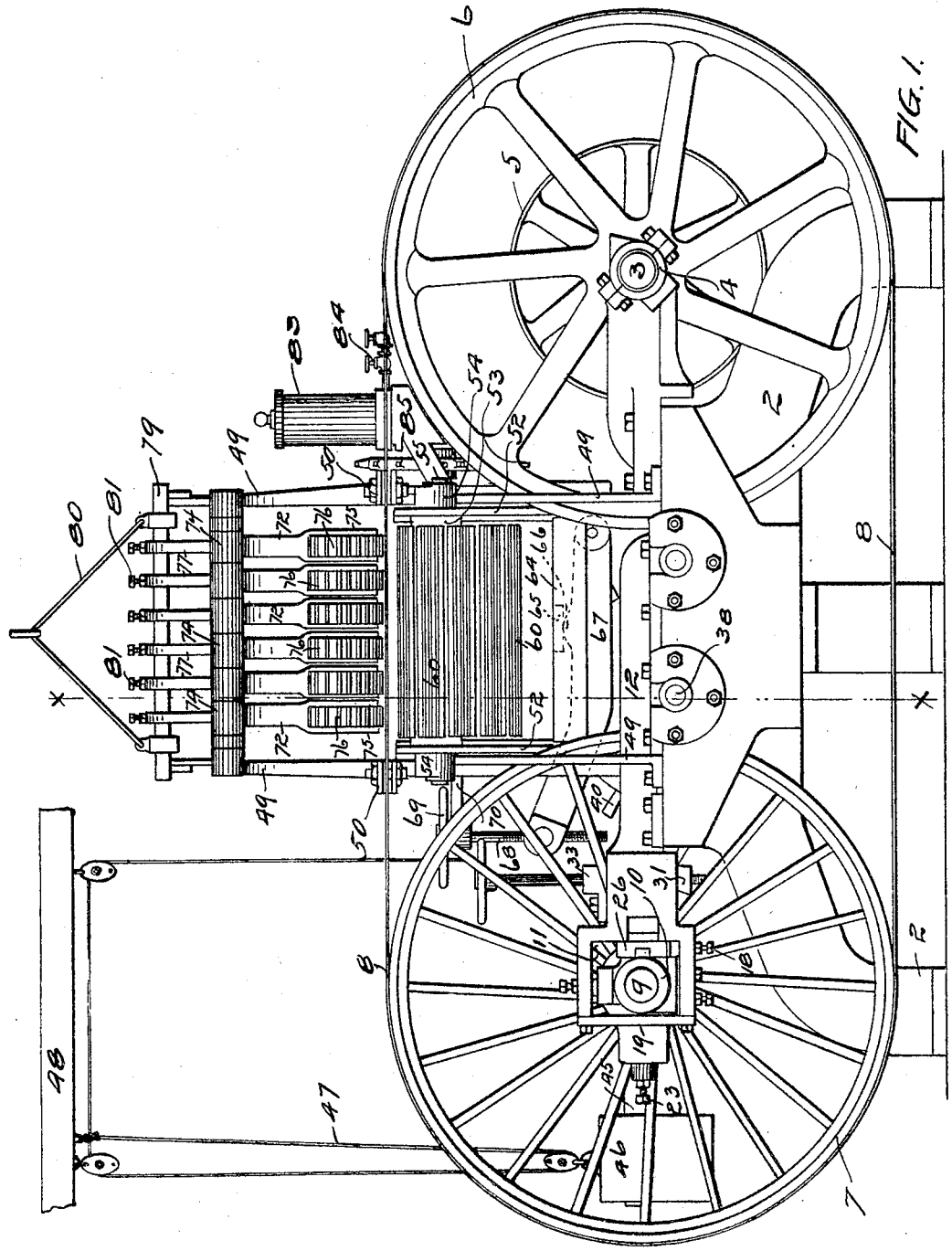
Figure 2:
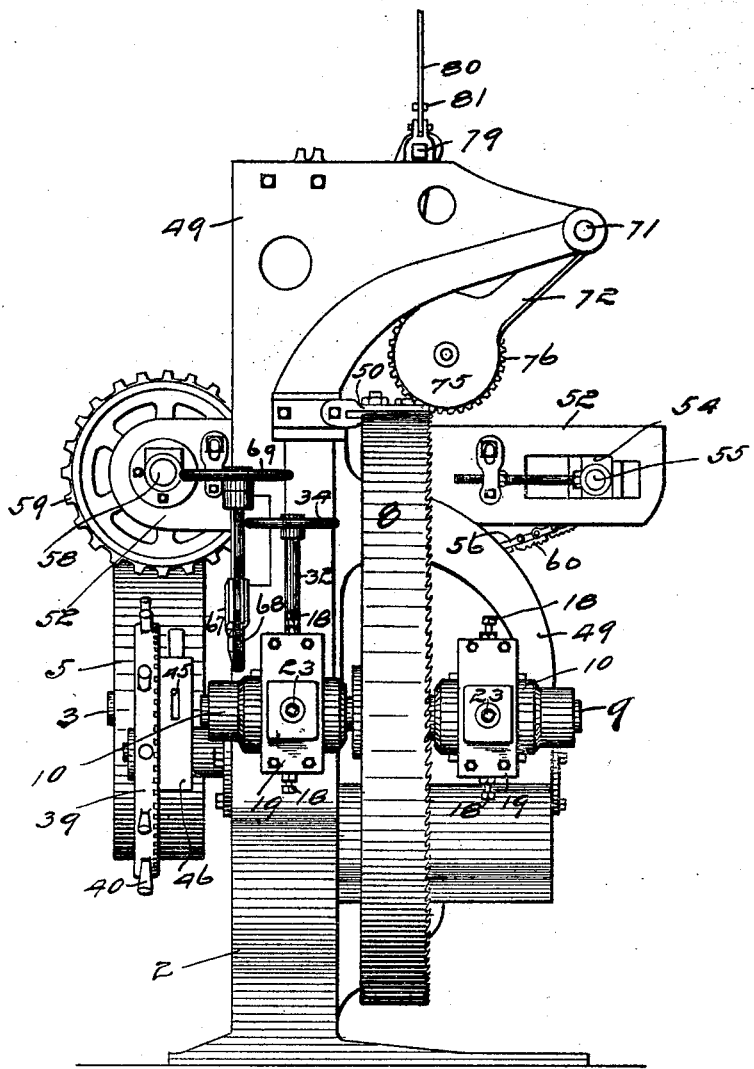
Figure 7:
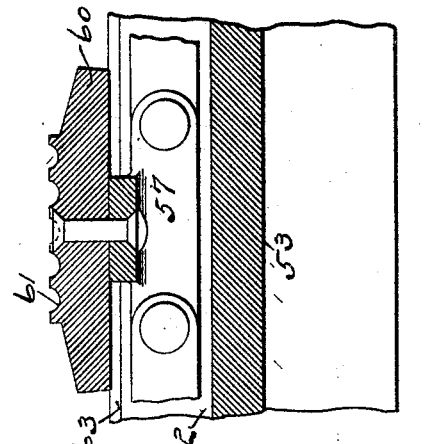
Figure 8:
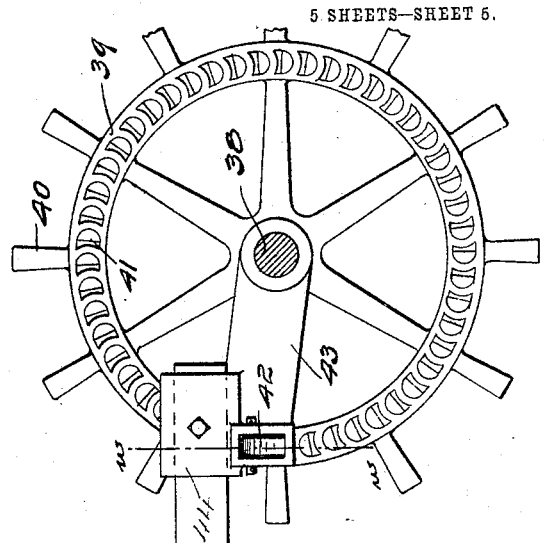
Figure 6:
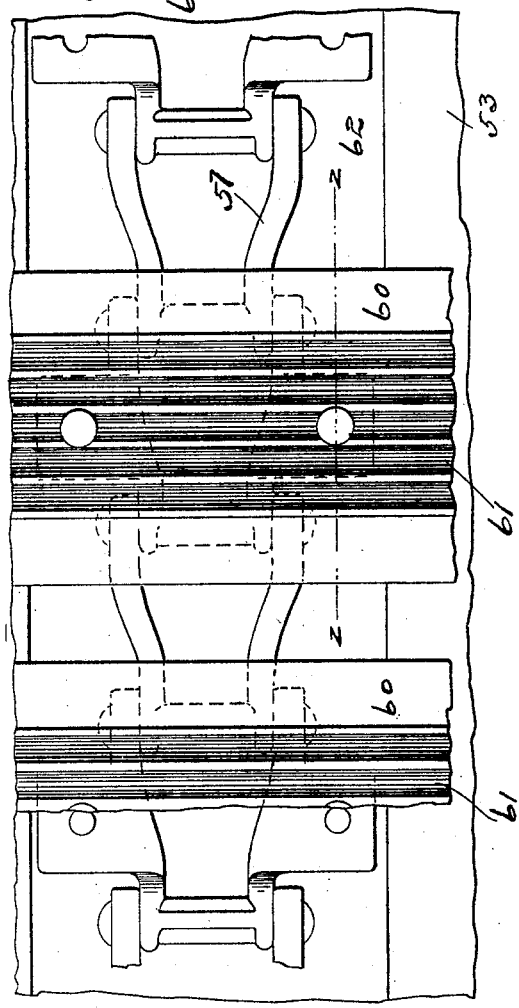
Figure 9:
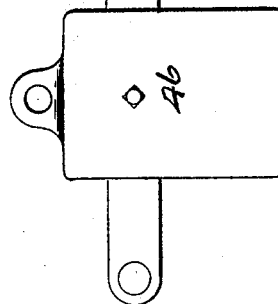

In the accompanying drawings, forming part of this specification, Figure 1 is a side elevation of a horizontal resawing-machine embodying my invention looking toward the discharge side of the machine. Fig. 2 is an end elevation. Fig. 3 is a transverse vertical section on the line $x\,x$ of Fig. 1. Fig. 4 is a longitudinal vertical section of one end of the machine, showing in detail the mechanism for oscillating one of the band-wheels. Fig. 5 is a sectional view on the line $y\,y$ of Fig. 4. Fig. 6 is a partial plan view of a portion of the feed-belt. Fig. 7 is a transverse section on the line $z\,z$ of Fig. 6. Fig. 8 is a detail of the tension mechanism. Fig. 9 is a section on the line $w\,w$ of Fig. 8.

In the drawings, 2 represents a base or frame whereon the operating parts of the mechanism are supported. 3 represents one of the band-wheel shafts mounted in fixed bearings 4 at one end of said base and provided with a driven pulley 5. A band-wheel 6 is mounted on said shaft and connected with a similar band-wheel 7 by a horizontally-arranged band-saw 8. The shaft 9 of the wheel 7 is provided with journal-boxes 10, arranged within chambers 11, provided in the outer ends of horizontal castings or columns 12, whose inner ends are provided with flanges 13, slidable in guides 14, arranged upon a flat surface or table 15 on said base. Plates 16 are provided between the journal-boxes 10 and the bottom walls of the chambers 11, and set-screws 18, provided in said walls and engaging said plates, permit the convenient vertical adjustment of said boxes and the shaft journaled therein. Caps 19 are provided for the open outer ends of the chambers 11, having sockets for coil-springs 21, that bear upon the outer members of the journal-boxes and have their tension regulated by means of plates 22 and adjusting-screws 23. These springs tend to press the journal-boxes toward the inner walls of the chambers 11 and hold the band-wheel 7 toward the other wheel with a yielding pressure.

It is desirable in a machine of this kind to provide means for swinging or sluing one of the band-wheels and its shaft laterally for the purpose of alining it with respect to the other wheel, and I therefore provide recesses 24 in the inner walls of the chamber 11 and arrange therein castings 25, having flanges 26, that bear upon the inner sections of the journal-boxes and are connected with oppositely-arranged but similar disks through blocks 27, of rubber or other yielding material, by bolts 28. These disks have flattened bearing-surfaces that slide on the bottom wall of the recesses when the band-wheel shaft is oscillated. A casting 29 is provided in one of said recesses having a bearing-surface to engage the flange of the inner disk and an inclined surface 30 to engage a wedge-shaped block 31, arranged within said recesses upon a threaded rod 32, that has a fixed bearing 33 in the upper wall of said recess. A slot 34 is provided in the lower wall of said recess to allow the adjustment of the block 31 with respect to the casting 29, and the rod 32 has a suitable hand-wheel 34 for convenience in revolving it and varying the adjustment of said wedge-shaped block. By turning this hand-wheel and raising or lowering the blocks 31 the operator can swing or slue the band-wheel 7 and its shaft to the desired position with respect to the other wheel, the outward movement of said shaft being against the tension of the springs 21, and the yielding block will serve to take up the lost motion and return said shaft to its normal position when the block 31 is lowered sufficiently to clear the contacting surface of the casting 29. Each of the columns 12 is provided at its inner end with a rack-bar 35, protected from dust and dirt by depending flanges 36 and engaged by pinions 37 on a shaft 38. This shaft carries the tension mechanism by means of which the proper sawing tension is applied to the saw after it has been placed on the wheels.

The tension mechanism comprises a wheel 39, secured on the shaft 38, having a series of spokes 40 for convenience of manipulation and a rim provided on its inner face with teeth 41, that are engaged by a dog 42, pivoted on an arm 43, that is loosely mounted on said shaft. (See Figs. 8 and 9.) A socket 44 is mounted on the arm 43, wherein a weight-arm 45, carrying a weight 46, is adjustably secured. (See Figs. 2 and 9.) A suitable operating-tackle 47 is attached to the free end of the arm 45 and to a suitable support 48 and by means of which the operator can raise the said arm, relieve the dog 42 of the weight thereon, and allow it to disengage itself from the teeth of the tension-wheel. (See Fig. 1.) When it is again desired to place the saw under tension, the dog is swung into engagement with the teeth by the finger of the operator and the lifting-tackle released to apply the power of the weight 46 to the tension-wheel through the pivoted dog and from thence to the saw.

Upon the base I arrange upright standards or brackets 49, carrying guides 50 for the saw, and vertically-arranged ribs 51, that form guides for the side plates 52 of a horizontal feed-table 53. The plates 52 extend in front and in the rear of the feed-table and on the receiving side of the machine are provided with adjustable bearings 54 for a shaft 55, provided with sprockets 56, over which chains 57 pass to similar sprockets on a shaft 58, mounted in fixed bearings in said plates at the rear of the machine. A driving-sprocket 59 is mounted on the shaft 58. The chains 56 pass over the feed-table and are connected at intervals by cross-bars 60, having longitudinally-corrugated surfaces 61, that engage the under surface of the lumber to feed the same past the saw, the edges of said bars being beveled or inclined, as shown in Fig. 7, to allow the corrugations to contact with the lumber-surfaces. The feed-table 53 is preferably provided with transverse grooves or depressions 62 to receive the chain belt, and a removable plate 63 is preferably provided on said table between said grooves whereon the cross-bars slide during the feeding operation. The edges of the plate 63 are downwardly turned to prevent the feed-belt catching thereon.

In a machine of this kind it is desirable to provide some means for adjusting the feed-table and belt vertically to accommodate the machine to lumber of different thickness, and I therefore connect the lower end of the plates 52 by a casting 64 and provide thereon a lug 65, that is engaged by a boss 66, provided on an arm 67, that is pivoted at one end (see Fig. 1) to a lug 49' on one of the standards 49 (see Fig. 3) and has a threaded hole at its opposite end to receive a threaded rod 68, provided with an operating-wheel 69 and supported by a bracket 70 on the other standard. This operating-wheel 70 is preferably near the wheel 34, heretofore described, where the operator can conveniently manipulate both of them and oscillate the adjustable band-wheel or raise or lower the feed-table.

It is frequently desirable in a resawing-machine, particularly of the horizontal type, to feed lumber of different thickness to the saw and sometimes pieces that vary in thickness from one edge to the other, as in quarter-sawing, and some means should be provided for holding such lumber firmly on the feed-belt and adjusting itself automatically to the varying thickness. With this end in view I provide a shaft 71 on the standards 49 and pivot thereon a series of hangers 72, adapted to oscillate freely and independently of each other on said shaft and having hubs 74, that keep them at all times a uniform distance apart. The lower ends of said arms are provided with forks 75, wherein toothed idle pressure-wheels 76 are mounted and adapted to swing vertically with said hangers above the feed-belt and rest by gravity upon the lumber and hold it firmly with a yielding pressure during the sawing operation. The shaft 71 is a sufficient distance in front and above the pressure-wheels to prevent them from being thrown back with the lumber when its ends strike the saw, but allows them to swing freely in a vertical direction and accommodate themselves to the different thicknesses of the lumber that is fed into the machine. Each of the hangers 72 is provided with an upwardly-extending arm 77, having a slot 78 to receive a bar 79, to which an operating-bail 80 is attached. Adjusting-screws 81 are provided on said arms, by means of which the hangers can be raised or lowered to vary the normal working position of the idle pressure-wheels with respect to the feed-belt.

An oil-can 83 is provided near the band-wheel 6 and arranged to discharge oil through the valves 84 upon the saw, and a scraper device 85 is provided to keep the surface of the band-wheel clear of sawdust and other refuse that is liable to accumulate thereon and passing under the saw interfere with its perfect adjustment and operation.

The operation of my improved horizontal band-resaw is as follows: The band-wheels having been alined and the proper tension applied to the saw, the operator will set the mill in motion and begin to deliver lumber to the feed-belt. As the boards, planks, or other pieces pass under the pressure feed-wheels the latter will be raised and will roll along the upper surface of the lumber, adjusting themselves whenever necessary automatically to any variation in thickness and holding it firmly down upon the feed-belt, the teeth of which engaging the under surface of the lumber will move it rapidly past the saw. If desired, the operator can feed simultaneously as many pieces of lumber of different thicknesses as there are pressure feed-wheels, or he can feed one piece of lumber that continually increases in thickness from one edge to the other, so that the pressure-wheels will all be upon different levels during the feeding operation. By the simple adjusting means described the feed belt and table can be raised or lowered according to the dimensions of the lumber and the desired thickness of the resaw.

I claim as my invention—

1. In a machine of the class described, the combination, with a horizontal band-saw, of a feed-belt extending from front to rear of the saw to afford a continuous support and feed for the work both to and from the saw and having slats provided with roughened surfaces operating beneath the saw to feed the lumber thereto, and a plurality of idle pressure-wheels supported above said belt and having toothed peripheries adapted to rest by gravity upon the lumber and overhanging the cutting edge of the saw so that their line of effective engagement should be at the cutting edge of the saw and adapted to adjust themselves independently of each other to the varying thickness of the lumber, said belt and idle wheels comprising the immediate feed to the saw.

2. In a machine of the class described, the combination with a horizontal band-saw, of a feed-belt extending from front to rear of the saw to afford a continuous support and feed for the work both to and from the saw and having slats operating to feed the lumber thereto, and a plurality of idle pressure-wheels supported above said belt and overhanging the cutting edge of the saw so that their line of effective engagement should be at the cutting edge of the saw and having toothed peripheries adapted to rest by gravity upon the lumber and adjust themselves independently of each other to the varying thickness of the lumber, said belt and idle wheels comprising the immediate feed to the saw, substantially as described.

3. In a machine of the class described, the combination, with a horizontal band-saw, of a feed-belt extending from front to rear of the saw to afford a continuous support and feed for the work both to and from the saw and having slats provided with roughened surfaces operating beneath the saw to feed the lumber thereto, and a plurality of idle pressure-wheels supported above said belt and overhanging the cutting edge of the saw so that their line of effective engagement should be at the cutting edge of the saw and having toothed peripheries adapted to rest by gravity upon the lumber and adjust themselves independently of each other to the varying thickness of the lumber, said belt and idle wheels comprising the immediate feed to the saw.

4. In a machine of the class described, the combination, with a horizontal band-saw, of a feed-belt extending from front to rear of the saw to afford a continuous support and feed for the work both to and from the saw and having slats operating beneath the saw to feed the lumber thereto, a series of hangers pivotally supported above said feed-belt, a series of toothed pressure-wheels pivoted on said hangers respectively and overhanging the cutting edge of the saw so that their line of effective engagement should be at the cutting edge of the saw and adapted to rest by gravity upon the lumber and move vertically with said hangers independently of one another to accommodate themselves to the varying thickness of the lumber, the pivots of said hangers being in front of and above the level of said pressure-wheels whereby backward movement of the lumber when it engages the saw will be prevented, said belt and idle wheels comprising the immediate feed to the saw.

5. In a machine of the class described, the combination with a horizontal band-saw, of a feed-belt extending from front to rear of the saw to afford a continuous support and feed for the work both to and from the saw, and an idle pressure-wheel supported above said belt immediately adjacent to the saw so that its line of effective engagement should be at the cutting edge of the saw, and adapted to rest upon the lumber, said belt and idle wheel comprising the immediate feed to the saw, substantially as described.

In witness whereof I have hereunto set my hand this 30th day of January, 1904.

HERMANN G. DITTBENNER.

In presence of—
  RICHARD PAUL,
  M. HAGERTY.